United States Patent [19]

Shingu et al.

[11] Patent Number: 5,796,054
[45] Date of Patent: Aug. 18, 1998

[54] LOUDSPEAKER DIAPHRAGM

[75] Inventors: Fumiteru Shingu; Kiyotaka Miyashita, both of Akishima; Kouichi Ogawa, Osaka; Akira Kose, Tachikawa; Asa Kimura, Yokohama, all of Japan

[73] Assignees: Foster Electric Co., Ltd.; Nihon Koken Kogyo Co., both of Tokyo; Shiseido Co., Ltd., Kanagawa, all of Japan

[21] Appl. No.: 827,705

[22] Filed: Apr. 9, 1997

[30] Foreign Application Priority Data

Apr. 12, 1996 [JP] Japan ................... 8-115543

[51] Int. Cl.[6] .................................. G10K 13/00
[52] U.S. Cl. .................. 181/167; 181/168; 181/169; 181/170
[58] Field of Search ................... 181/157, 167, 181/168, 169, 170, 173, 174

[56] References Cited

U.S. PATENT DOCUMENTS

| 4,026,384 | 5/1977 | Yamachika et al. | 181/167 |
| 4,412,103 | 10/1983 | Fujii et al. | |
| 4,471,085 | 9/1984 | Yamamoto et al. | 181/157 |

*Primary Examiner*—Khanh Dang

[57] ABSTRACT

A loudspeaker diaphragm is provided as an injection molded material including 50 to 80 weight % of a matrix resin of polyolefins and 20 to 50 weight % of flaky mica having an average aspect ratio of more than 10 and including at least 3 weight % or more of pearl mica. The matrix resin of polyolefins includes respective flakes of the flaky mica orientated in parallel to thereby improve the acoustic characteristics and concurrently the design appearance of the diaphragm. The design appearance of the diaphragm can have bright colors and a pearly luster.

7 Claims, 3 Drawing Sheets

5,796,054

1

LOUDSPEAKER DIAPHRAGM

BACKGROUND OF THE INVENTION

This invention relates to a loudspeaker diaphragm suitable for use in high grade speaker system or the like to be used in general homes and vehicles, and is excellent in both of acoustic characteristics and design.

DESCRIPTION OF RELATED ART

As material for the loudspeaker diaphragm, paper has been widely employed, whereas in recent years copolymers of polyolefins have been attracting public attention in respect to the acoustic characteristics, durability, workability, costs and so on, and their use has been expanded. For the diaphragm material, a high specific modulus and a moderate internal loss are desired in view of the acoustic characteristics, but copolymers of polyolefins are not sufficient in the specific modulus while a large internal loss is shown. Various composite materials have been suggested by mixing a reinforcing member such as carbon graphite, mica and the like with the copolymers in attempt to improve their acoustic characteristics.

In U.S. Pat. No. 4,412,103, there has been disclosed that an acoustic diaphragm manufactured by mixing 30 to 95 weight % of copolymers of polyolefins, and 5 to 70 weight % of mica having a weight average flake diameter of less than 500 μm and more than 10 of weight-average aspect ratio shows excellent acoustic characteristics.

In the case of the diaphragm for use in the high grade speaker systems and so on to be used in homes and vehicles, on the other hand, the demand not only of the acoustic characteristics but also of the design appearances has become high in addition to characteristics such as the reliability, durability, weatherabillity and so on. Even diaphragms provided, in particular, with bright and diverse colors have become strongly desired.

Hitherto, as the diaphragms provided with colors, there have been one having a laminate of pigment-blended resin member on the surface of a diaphragm made of a fibrous substrate, and another injection-molded for scattering pigments in a matrix resin. In the former, however, manufacturing steps have been complicated, and the bright colors without any running have been difficult to be realized, while the durability and wheatherability were also insufficient. In the latter, there has been no one developed satisfactorily in both of the acoustic characteristics and the design appearances, without satisfying the acoustic characteristics nor realizing the bright colors.

In the case of the colored diaphragm obtained through the injection molding with the pigment-blended matrix resin, this diaphragm will be advantageous with respect of the easiness of manufacture and durability as compared with the former having the laminate to colored coating on the surface of the diaphragm substrate, and there has been one, other than the foregoing with the pigments only added to the matrix resin, which has been attempted to satisfy both of the improved acoustic characteristics and high coloring effect with the pigments added to the matrix resin charged with such reinforcing material as mica.

In the conventional colored diaphragm, however, when such general particulate pigments as titanium dioxide, iron oxide, chromium oxide, carbon black and the like are blended in the matrix resin as randomly scattered, there have been such problems that the diffusion of light is caused to occur by the pigments, so that it has been unable to attain a color tone having the brightness and transparency in the diaphragm colored, for example, by the scattering blend of the pigments in the matrix resin, and that the rate of propagation is very low due to the absence of any reinforcing member so as to render the internal loss tan δ to be lowered by the influence of the pigments. Yet, diaphragms charged with a reinforcing member such as mica or the like has had such drawbacks that any bright color tone cannot be obtained similarly to those not reinforced, so as to be further dull in the color tone due to the influence of mica added as the reinforcing member, so that the improvement in the acoustic characteristics resulting from the charging of mica has been reduced by the deterioration in the rate of propagation and tan 67 value as influenced by the pigments.

For the reinforcing member, other than mica, carbon graphite and the like have been employed but, in this event, such member is improper except for coloring into dull colors of black series, and no bright color can be obtained.

SUMMARY OF THE INVENTION

It is an object of the present invention to provide a loudspeaker diaphragm which can overcome the foregoing problems and is capable of attaining a high specific modulus, high internal loss and excellent reproduction tone quality, and of further improving the design appearances with bright colors not previously obtainable.

According to the present invention, the above object can be realized by means of a loudspeaker diaphragm comprising an injection molded form of a material including 50 to 80 weight % of matrix resin of polyolefins, and 20 to 50 weight % of flaky mica of more than 10 in the average aspect ratio and including at least 3 weight % or more of pearl mica, the material being injection molded to have the flakes of mica orientated in parallel within the matrix resin of polyolefins.

Other objects and advantages of the present invention shall become clear as the description of the invention advances with reference to an embodiment shown in accompanying drawings.

While the present invention shall now be described with reference to the embodiment shown in the accompanying drawings, it should be appreciated that the intention is not to limit the invention only to the embodiment shown but rather to include all alterations, modifications and equivalent arrangements possible within the scope of claims.

DETAILED DESCRIPTION OF THE PREFERRED EMBODIMENT

The structure of the loudspeaker diaphragm of the present invention shall be described in detail with reference to FIGS.

Figure 5:
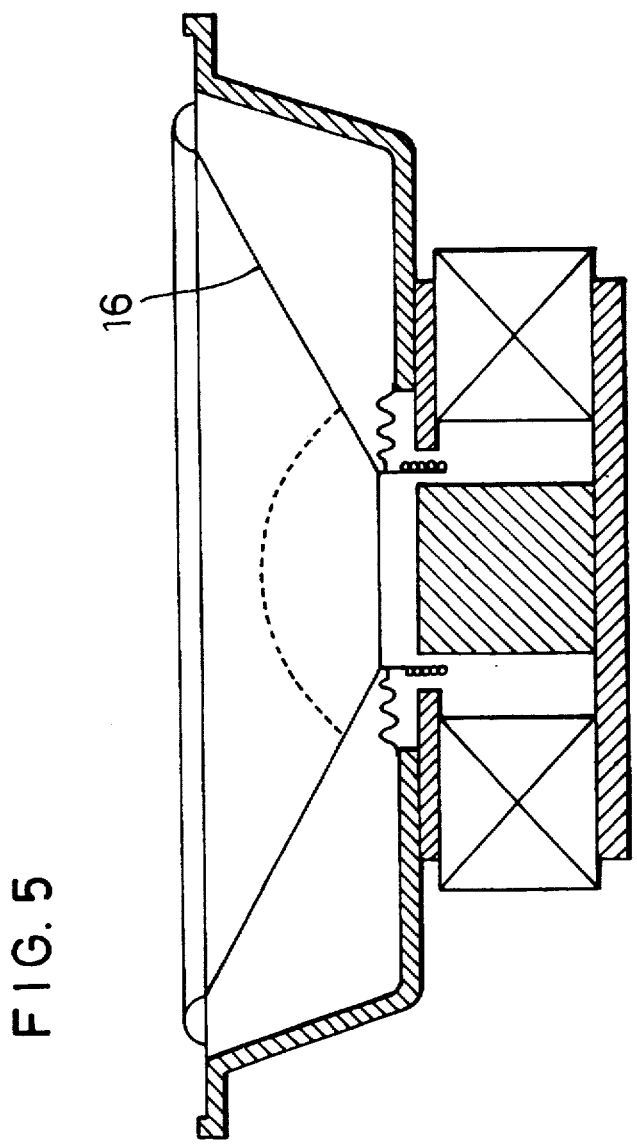
FIG. 5 is a schematic sectioned view showing an example of a loudspeaker in which the diaphragm of the present invention formed as a cone-shaped diaphragm is mounted.

1–5 showing an embodiment thereof. FIG. 5 shows a loudspeaker having a cone-shaped diaphragm 16. In the following, the pearl mica refers to a mica in which mica flakes respectively have on their surfaces a high refractive index layer formed by coating the surfaces with a metal oxide or the like of a higher refractive index of light than mica, to have the mica flakes provided as a whole with a function of the pigments.

Figure 1:
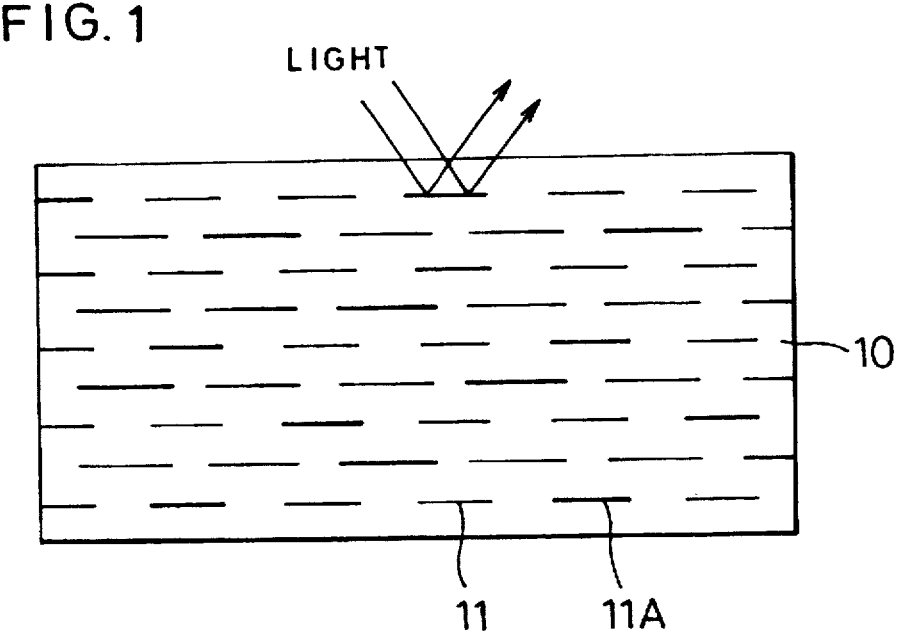
FIG. 1 is a schematic view for showing in a section a construction of the diaphragm in an embodiment of the present invention.

In FIG. 1, the pearl mica is formed with a uniform coupling of titanium dioxide (the refractive index 2.3–2.7) to the surfaces of mica (the refractive index 1.5–1.6), in which an interference occurs due to a phase lag of light reflected at boundaries between mica 11 and titanium dioxide 12 with respect to light reflected on the surface of titanium dioxide 12 so that a specific tone will be emphasized. With the thickness of titanium dioxide varied, the tone can be modified, and a desired tone can be obtained. Instead of titanium dioxide, a layer of iron oxide or of other metallic oxide may be formed to realize a tone specific to the metallic oxide employed, which may also be regarded as a sort of pearl mica.

Figure 3:
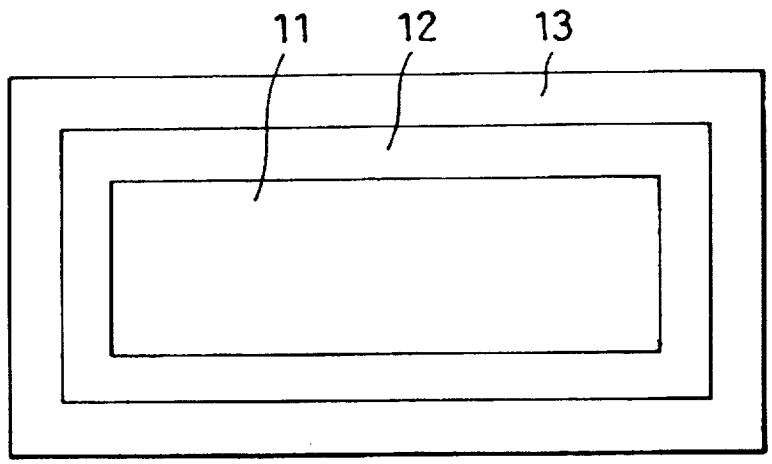
FIG. 3 is a structural schematic view showing another example of the pearl mica employed in the present invention.

In FIG. 3, there is shown an example of double structure obtained by coupling of colloidal particles 13 of colored inorganic compounds such as carbon black, iron hydroxide, iron oxide, ferric ferrocyanide, chromium hydroxide, chromium oxide, cobalt nitride and so on to the surfaces of the layer of titanium dioxide 12, over the mica 11.

Figure 4:
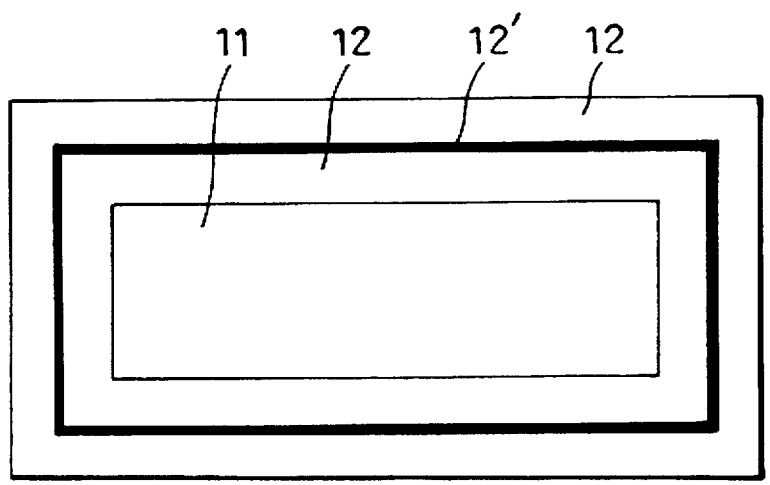
FIG. 4 is a structural schematic view showing still another example of the pearl mica employed in the present invention.

In FIG. 4, there is further shown an example of triple structure, in which the surface of titanium dioxide 12 formed on the surface of mica 11 are reduced to produce a layer of lower titanium oxide 12' and a layer of titanium dioxide 12 is formed again on the layer 12', and a bright color tone can be obtained still higher in the color development and excellent in the brightness by means of the layer of low titanium oxide 12' which appears in black color.

In the present invention, the flaky mica used as the base material and subjected to such surface treatment as has been described to be provided as a whole with the function of pigments is generally regarded as the pearl mica, so as to be clearly distinguished from generally used particulate pigments.

Thus, the basic material of the loudspeaker diaphragm of the present invention comprises, as shown in the sectioned view of FIG. 1, the matrix resin 10 of polyolefins charged with the flaky mica 11 containing the pearl mica 11A, which material is injection molded into the diaphragm in which the flakes of mica are orientated in strata to be in parallel to the surface of the diaphragm.

For the matrix resin of polyolefins, such resin of 100% polyolefins as polypropylene, a mixture of polypropylene with 3 to 10% of elastomer and so on are employed, to an extent of 30 to 80 weight %.

For the flaky mica, one having a high aspect ratio to be more than 10 in the average aspect ratio is employed to an extent of 20 to 50 weight %, including at least 3 weight % of pearl mica.

The loudspeaker diaphragm of the present invention comprises a material including 50 to 80 weight % of matrix resin of polyolefins and 20 to 50 weight % of flaky mica of the high aspect ratio, the material being injection-molded into the diaphragm in which mica flakes are orientated in parallel within the matrix resin of polyolefins, whereby the diaphragm is provided with excellent acoustic characteristic because of the physical performance of high specific modulus and high internal loss, and with excellent colors because of the inclusion of at least 3 weight % of the pear mica in the flaky mica so as to also function as the coloring agent in addition to the function as the reinforcing member, without deterioration in the acoustic characteristics in contrast to any prior art, satisfying thus both of the characteristic performance and the design appearance.

Further, with the use of the mixture of a resin of polyolefins with 3 to 10 weight % of elastomer, as the matrix resin of polyolefins, the acoustic characteristics can be further improved. This is because, while the mixing of the reinforcing member with the polyolefin resin renders the specific modulus to be elevated but the high internal loss inherent to the polyolefin resin to be lowered, the addition of elastomer high in the vibration-damping properties enables it possible to prevent the internal loss from being lowered.

While the flaky mica may be al replaced by the pear mica, 3 to 12 weight % of pearl mica allows an excellent color tone having substantially the same level of pearl luster to be obtainable, and the amount of pearl mica which is practically expensive can be reduced to lower the costs.

For the pearl mica, various types of the same can be used for adaption to the users' need, and a diversity of color tones can be obtained by varying the material, thickness and so on of the layers of the high refractive index. In order to attain delicate adjustment, while concurrent use with genera particulate pigment of a trace amount to an extent of not giving to the acoustic characteristics any influence may be possible. The use of pearl mica having the high refractive index layers in the three-layer structure with the low titanium oxide formed by reducing the surface of titanium dioxide layer formed on the surface of the flaky mica and with the titanium dioxide layer formed thereon produces the bright color tone of extremely high color development and brightness.

The present invention shall be described in detail in the followings with reference to certain examples.

EXAMPLE 1

A diaphragm was manufactured by injection-molding of a mixture of 65 weight % of PP/EPDM matrix resin consisting of polypropylene (PP) and 5% of ethylene-propylene-dien terpolymer rubber (EPDM), with 35 weight % of pearl mica (Infinite Color BB-02-L1 by SHISEIDO).

EXAMPLE 2

A diaphragm was manufactured by injection-molding of a mixture of 65 weight % of the same PP/EPDM matrix resin as that in Example 1, 10 weight % of pearl mica (Infinite Color BB-02-L1 by SHISEIDO) and 20 weight % of flaky mica of mica material only without provision of any high refractive index layer.

EXAMPLE 3

A diaphragm was manufactured through injection-molding of a mixture of 65 weight % of the same PP/EPDM matrix resin as in Examples 1 and 2, 34.5 weight % of pearl mica (MG-100R by NIPPON KOHKEN) and 0.5 weight % of particulate carbon black.

As comparative Examples 1–5, diaphragms were manufactured through injection-molding of a material consisting of the same PP/EPDM as in Examples 1–3 or PP as the base, without containing pearl mica.

The flaky mica employed in Examples 1–3 and in Comparative Examples 1–5 was of more than 10 in the average aspect ratio throughout, and the pearl mica of Examples 1–3 employed a base of equivalent high aspect ratio.

Results of evaluation of the physical properties, coloring/design appearances and acoustic characteristics of the diaphragms of Examples 1–3 were as shown in the following Table 1, whereas the evaluation of the physical properties, coloring/design appearances and acoustic characteristics of the diaphragms of Comparative Examples 1–5 was as shown in a following Table 2.

TABLE 1

| | Mixed Material (wt. %) | Dens. | Propag. Rate (m/sec) | tan δ | Col'g/ Design Appear. | Acous. Charac. |
|---|---|---|---|---|---|---|
| Exm. 1 | PP/EPDM 65% Pearl Mica 35% | 1.19 | 2520 | 0.082 | ⊚ | ○ |
| Exm. 2 | PP/EPDM 65% Pearl Mica 10% Flaky Mica 25% | 1.18 | 2480 | 0.082 | ⊚ | ○ |
| Exm. 3 | PP/EPDM 65% Pearl Mica 34.5% Carbon Blk. 0.5% | 1.19 | 2400 | 0.078 | ○ | ⊚ |

TABLE 2

| | Mixed Material (wt. %) | Dens. | Propag. Rate (m/sec) | tan δ | Col'g/ Design Appear. | Acous. Charac. |
|---|---|---|---|---|---|---|
| Comp. Ex. 1 | PP/EPDM 65% Flaky Mica 35% | 1.18 | 2440 | 0.082 | x | ○ |
| Comp. Ex. 2 | PP/EPDM 65% Flaky Mica 33.5% Gen. Pig. 1.5% | 1.18 | 2350 | 0.068 | ○ | ○ |
| Comp. Ex. 3 | PP/EPDM 100% | 0.92 | 1300 | 0.080 | x | x |
| Comp. Ex. 4 | PP/EPDM 98.5% Gen. Pig. 1.5% | 0.93 | 1240 | 0.070 | ○ | x |
| Comp. Ex. 5 | PP 65% Flaky Mica 35% | 1.18 | 2560 | 0.040 | x | ○ |

In the evaluation marks of the above Tables, ⊚ denotes "Excellent", ○ denotes "Good", and x denotes "Inferior".

While the results of evaluation as to the coloring/design appearances were of relative evaluation by means of functional test, Examples 1–3 have all realized lustrous, bright color tone and shown clear superiority over Comparative Examples 1–5. While not described in the Tables, further precise experiments made with the adding amount of pearl mica changed variously have shown results that no sufficiently excellent tone was shown with less than 3 weight %, and almost no difference could be recognized in the effect even when added by more than 12 weight %.

From Comparative Examples 2 and 4, it should be appreciated that the general pigment added for coloring has affected the acoustic characteristics. While Comparative Example 2 appeared attaining both of the coloring/design appearances and the acoustic characteristics substantially excellent, it could be clearly discriminated that, when compared with Comparative Example 1, the improvement in the acoustic characteristics obtained by the reinforcing member was reduced by the general pigment.

Further, the pearl mica (Infinite Color BB-02-L1 by SHISEIDO) employed in Examples 1 and 2 was the one having the triple structure as shown in FIG. 4, and has a lustrous, bright blue color.

Figure 2:
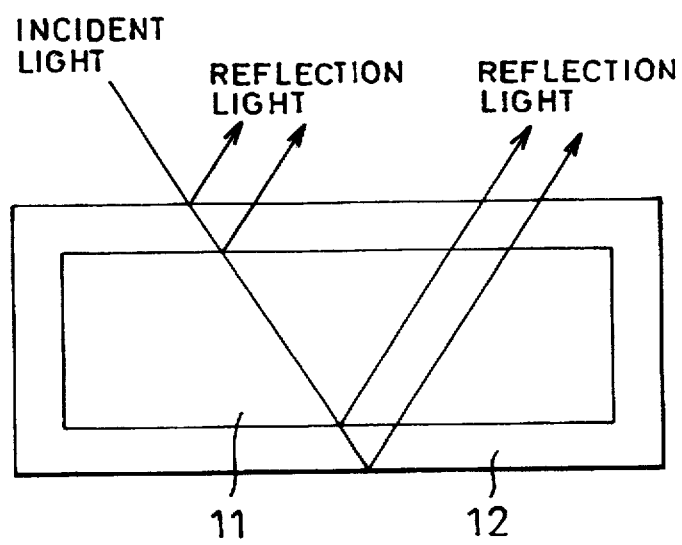
FIG. 2 is a structural schematic view showing an example of pearl mica employed in the present invention.

Further, the pearl mica (MG-100R by NIPPON KOHKEN) was of the type shown in FIG. 2 and was effective to develop green color, and its color tone was made deeper by an action of carbon black added by a trace amount.

In respect of variation in the internal loss and sound velocity when composition ratio of mica was modified, the mixing of mica with polypropylene only, in the absence of elastomer, the sound velocity was increased in accordance with the composition ratio of mica while the internal loss was remarkably lowered, but it was found that, when the limited elastomer was mixed, the internal loss has shown peculiarity to be of an excellent property, and both of the sound velocity and internal loss were remarkably improved.

In the present invention, various design modification is possible. For example, it should be appreciated that, in order to improve the weatherability, any known ultraviolet inhibitor, aging inhibitor, oxidation inhibitor and the like are properly added within the technical scope of the present invention, in addition to the arrangements shown in the respective Examples.

What is claimed is:

1. A loudspeaker diaphragm comprising an injection molded form of a material including 50 to 80 weight % of a matrix resin of polyolefins, and 20 to 50 weight % of flaky mica having an average aspect ratio of more than 10 and including at least about 3 weight % or more of pearl mica, the material being injection molded to have flakes of the flaky mica orientated in parallel within the matrix resin of polyolefins.

2. The diaphragm according to claim 1, wherein said matrix resin of polyolefins includes 90 to 97 weight % of a resin of polyolefins and 3 to 10 weight % of an elastomer, with respect to said matrix resin.

3. The diaphragm according to claim 1, wherein said pearl mica is in an amount from about 3 to about 12 weight %.

4. The diaphragm according to claim 2, wherein said pearl mica is in an amount from about 3 to about 12 weight %.

5. The diaphragm according to claim 1, wherein said pearl mica comprises three layers of high refractive index formed on the surface of respective flakes of the flaky mica, the three layers including a titanium dioxide layer formed on the flakes, a low titanium oxide layer formed by reducing the surface of said titanium dioxide layer, and an additional titanium dioxide layer formed on the low titanium oxide layer.

6. The diaphragm according to claim 2, wherein said pearl mica comprises three layers of high refractive index formed on the surface of respective flakes of the flaky mica, the three layers including a titanium dioxide layer formed on the flakes, a low titanium oxide layer formed by reducing the surface of said titanium dioxide layer, and an additional titanium dioxide layer formed on the low titanium oxide layer.

7. The diaphragm according to claim 3, wherein said pearl mica comprises three layers of high refractive index formed on the surface of respective flakes of the flaky mica, the three layers including a titanium dioxide layer formed on the flakes, a low titanium oxide layer formed by reducing the surface of said titanium dioxide layer, and an additional titanium dioxide layer formed on the low titanium oxide layer.

* * * * *